United States Patent
Lingarajappa

(10) Patent No.: US 11,016,848 B2
(45) Date of Patent: May 25, 2021

(54) DISTRIBUTED DATA STORAGE SYSTEM WITH INITIALIZATION-LESS PARITY

(71) Applicant: Seagate Technology LLC, Cupertino, CA (US)

(72) Inventor: Chetan Bendakaluru Lingarajappa, Bangalore (IN)

(73) Assignee: Seagate Technology LLC, Fremont, CA (US)

( * ) Notice: Subject to any disclaimer, the term of this patent is extended or adjusted under 35 U.S.C. 154(b) by 75 days.

(21) Appl. No.: 15/801,882

(22) Filed: Nov. 2, 2017

(65) Prior Publication Data

US 2019/0129794 A1 May 2, 2019

(51) Int. Cl.
 *G06F 11/10* (2006.01)
 *G06F 16/182* (2019.01)
 *G06F 11/20* (2006.01)

(52) U.S. Cl.
 CPC ........ *G06F 11/1076* (2013.01); *G06F 11/108* (2013.01); *G06F 16/184* (2019.01); *G06F 11/2056* (2013.01); *G06F 2211/1028* (2013.01)

(58) Field of Classification Search
 CPC ............. G06F 11/1076; G06F 11/2056; G06F 16/184; G06F 2211/1028
 See application file for complete search history.

(56) References Cited

U.S. PATENT DOCUMENTS

| | | |
|---|---|---|
| 3,876,978 A | 4/1975 | Bossen et al. |
| 4,092,732 A | 5/1978 | Ouchi |
| 4,201,976 A | 5/1980 | Patel |
| 4,205,324 A | 5/1980 | Patel |
| 4,375,100 A | 2/1983 | Tsuji et al. |
| 4,467,421 A | 8/1984 | White |
| 4,517,663 A | 5/1985 | Imazeki et al. |
| 4,547,882 A | 10/1985 | Tanner |
| 4,667,326 A | 5/1987 | Young et al. |
| 4,688,221 A | 8/1987 | Nakamura et al. |
| 4,722,085 A | 1/1988 | Flora et al. |
| 4,755,978 A | 7/1988 | Takizawa et al. |
| 4,761,785 A | 8/1988 | Clark et al. |
| 4,778,978 A | 10/1988 | Hartness |
| 4,796,260 A | 1/1989 | Schilling et al. |

(Continued)

OTHER PUBLICATIONS

"Standard RAID levels" Wikipedia as captured by Wayback Machine Internet Archive. Also available at https://web.archive.org/web/20170609120801/https://en.wikipedia.org/wiki/Standard_RAID_levels. (Year: 2017).*

*Primary Examiner* — Jane Wei
(74) *Attorney, Agent, or Firm* — Hall Estill Attorneys at Law

(57) ABSTRACT

In a data storage system with distributed data storage units, initialization-less parity can be practiced with a storage controller connected to a storage memory and multiple data storage units. Data locations of data storage devices of the respective data storage units can be arranged as distributed data storage groups as directed by the storage controller prior to receiving a write request to a distributed data storage group. Unwritten data locations of the distributed data storage group are identified by consulting the storage memory and each unwritten data storage location may be assumed to have a zero value when computing parity data for the distributed data storage group.

20 Claims, 4 Drawing Sheets

(56) References Cited

U.S. PATENT DOCUMENTS

| | | | |
|---|---|---|---|
| 4,817,035 A | 3/1989 | Timsit | |
| 4,825,403 A | 4/1989 | Gershenson et al. | |
| 4,837,680 A | 6/1989 | Crockett et al. | |
| 4,847,842 A | 7/1989 | Schilling | |
| 4,849,929 A | 7/1989 | Timsit | |
| 4,849,974 A | 7/1989 | Schilling et al. | |
| 4,849,976 A | 7/1989 | Schilling et al. | |
| 5,787,460 A * | 7/1998 | Yashiro | G06F 11/1076 711/113 |
| 7,103,716 B1 * | 9/2006 | Nanda | G06F 11/1076 711/114 |
| 8,209,587 B1 | 6/2012 | Taylor et al. | |
| 2008/0229012 A1 * | 9/2008 | Therene | G06F 11/1076 711/114 |
| 2015/0067439 A1 * | 3/2015 | Yamaki | G06F 11/1012 714/758 |

\* cited by examiner

DISTRIBUTED DATA STORAGE SYSTEM WITH INITIALIZATION-LESS PARITY

SUMMARY OF THE INVENTION

A data storage system with distributed data storage units, in accordance with some embodiments, has a storage controller connected to a storage memory and the multiple data storage units. Data locations of data storage devices of the respective data storage units are arranged as distributed data storage groups as directed by the storage controller prior to receiving a write request to a distributed data storage group. Unwritten data locations of the distributed data storage group are identified by consulting the storage memory. The unwritten data storage locations are then assumed to have a zero value when computing parity data for the distributed data storage group.

Various embodiments connect a storage controller to a storage memory and multiple data storage units with data locations of data storage devices of the respective data storage units arranged as logical rows and columns as directed by the storage controller. Receipt of a write request to data locations of a distributed data storage group prompts the writing of user data to the data locations of the distributed data storage group prior to consulting the storage memory to identify unwritten data locations of the distributed data storage group. Each unwritten data location is assumed to have a zero value while computing parity data for the distributed data storage group.

In other embodiments, a storage controller is connected to a storage memory and multiple data storage units with data locations of data storage devices of the respective data storage units arranged as logical rows and columns as directed by the storage controller. Receiving a write request to data locations of a distributed data storage group causes the user data of the write request to be written to the data locations of the distributed data storage group prior to consulting the storage memory to identify unwritten data locations of the distributed data storage group. Each unwritten data location is assumed to have a zero value while computing parity data for the distributed data storage group and the parity data is then written to the distributed data storage group.

DETAILED DESCRIPTION

Various embodiments of the present disclosure are generally directed to distributed data storage systems with parity data that is created after system initialization.

Distributed data storage systems can be configured to provide relatively large data storage capacity that can be efficiently accessed by one or more remote hosts. However, demand for reduced data access times has emphasized the speed in which a distributed data storage system can provide data to a host. Hence, industry and consumer interest is directed at optimizing initialization of a distributed data storage system.

Accordingly, various embodiments configure a distributed data storage system with a storage controller connected to a storage memory and the multiple data storage units where data locations of data storage devices of the respective data storage units are arranged as distributed data storage groups as directed by the storage controller prior to receiving a write request to a distributed data storage group. User data is written to the data locations of the distributed data storage group before unutilized data locations of the distributed data storage group are identified by consulting the storage memory. The unutilized data storage locations are then assumed to have a zero value when computing parity data for the distributed data storage group.

The ability to eliminate parity computation as part of initialization of a data storage unit in a distributed data storage system allows for faster system time-to-ready along with shorter data access times for newly added portions of the data storage system. By eliminating both online and offline parity initialization in a data storage system, time and processing resources can be saved and directed to other system operations, which results in a more responsive data storage system with faster data storage performance.

Figure 1:
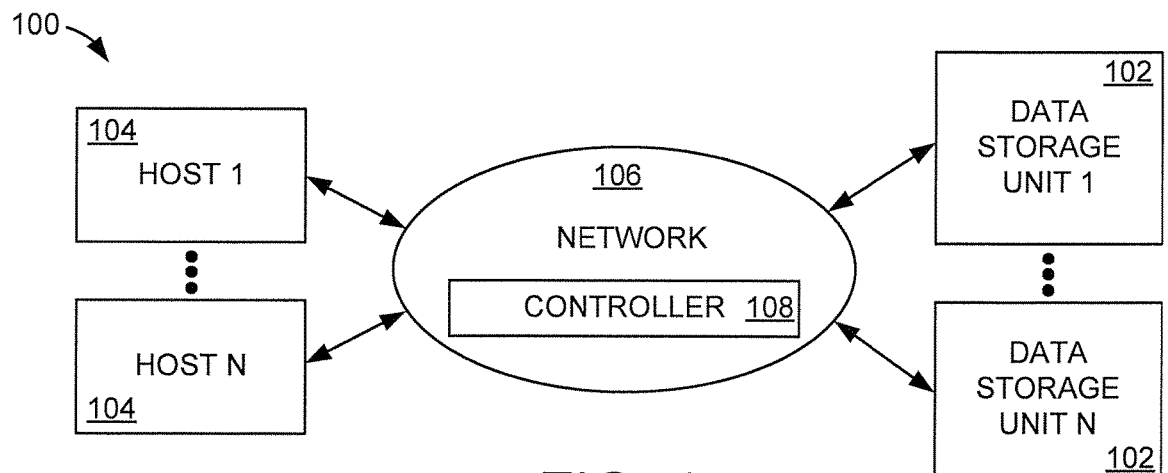
FIG. 1 is a block representation of an example data storage system arranged in accordance with various embodiments.

An example distributed data storage system 100 is illustrated in FIG. 1 as a block representation of an environment where various embodiments can be practiced. The distributed data storage system 100 can have any number of data storage units 102 (1 to X) connected to any number of remote hosts 104 (1 to N) via a network 106. The data storage units 102 may be individual data storage devices or conglomerations of multiple data storage devices that provide a collective data capacity to the system 100. It is noted that the data storage units 102 of the distributed system 100 can be similar or dissimilar types of memory with matching, or different, data capacities and/or data access performance characteristics.

The remote hosts 104 may be any origin for data storage operations connected to the respective data storage units 102 via wired and/or wireless interconnections. The network 106 may have one or more network controllers 108 that direct data storage and data maintenance operations individually, concurrently, or sequentially in the respective data storage units 102. The ability to configure the hosts 104 and data storage units 102 at different physical locations, such as different cities, states, countries, and hemispheres, allows the data storage system 100 to have high data reliability and retention, particularly when the system 100 is configured as a redundant array of independent devices (RAID).

Figure 2:
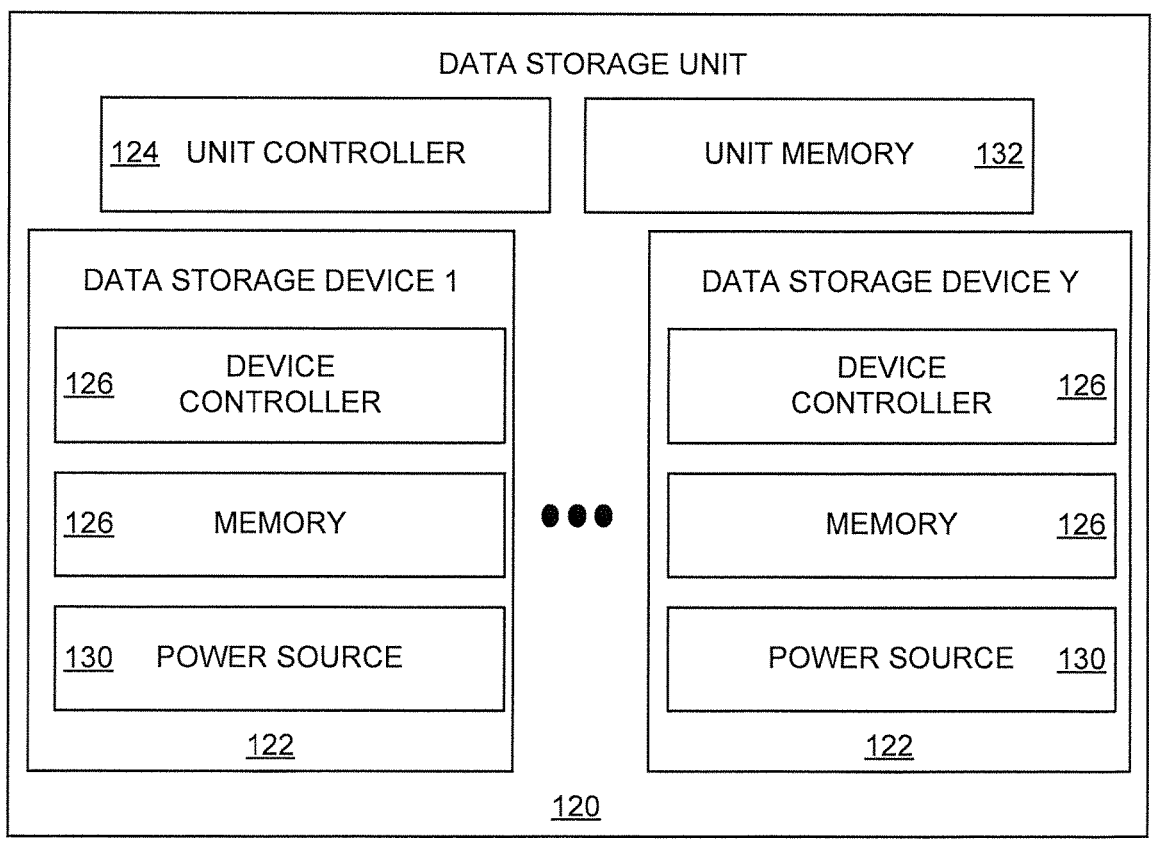
FIG. 2 displays a block representation of an example data storage unit capable of being utilized in the data storage system of FIG. 1.

FIG. 2 represents an example data storage unit 120 that may be utilized in the distributed data storage system 100 of FIG. 1 in accordance with some embodiments. A data storage unit 120 can comprise any number of data storage devices 122 (1 to Y) that each can provide data access to a remote host, such as host 104 of FIG. 1. For instance, the data storage devices 122 can operate individually and collectively to store, and retrieve, data upon request from a host.

It is contemplated that the data storage devices 122 are each a similar type of data storage, such as a hard disk drive (HDD) or solid-state array, but some embodiments configure the data storage devices 122 of a single data storage unit 120 to be different types of data storage to provide a hybrid data storage arrangement. Regardless of the types of data storage provided by the respective data storage devices 122, the data storage unit 120 can have different data storage performance characteristics, such as error rate, read latency, write latency, and power consumption. The ability to configure a data storage unit 120 with data storage devices 122 that have differing data storage performance characteristics allows a unit controller 124 to direct data access operations, such as data writes and data reads, to data storage device(s) 122 that provide optimized performance, such as lowest error rate and/or fastest read latency, under current data access load.

Although not required or limiting, each data storage device 122 has a local device controller 126 that directs data access and maintenance operations to local memory 128, which can be a rotating magnetic disk or NAND flash array. The device controller 126 and memory 128 can each be powered by a local power source 130, but such is not required as multiple devices 122 can be powered by a common power source of the data storage unit 120. With each device 122 having its own power source 130, controller 126, and memory 128, a device 122 can be characterized as a stand-alone component that may be inserted, removed, and transplanted without disturbing or modifying the operation of the other devices 122 of the data storage unit 120.

The stand-alone configuration of the respective data storage devices 122 further allows for efficient device swapping, removal, and addition. That is, a data storage device 122 may be replaced upon failure just as additional devices 122 can be added to the data storage unit 120 at will. Such modularity allows for robust RAID configurations with adaptable data storage capacity and performance. However, the modularity of a data storage unit 120 can correspond with increased data maintenance and overhead that stresses the unit 124 and device 126 controllers, particularly RAID configurations where data parity is computed upon initialization of the data storage unit 120. Thus, various embodiments are directed to a distributed data storage system that utilizes the unit controller 124 in concert with a unit memory 132 to operate at least one data storage unit 120 as a RAID, but without parity computations upon unit 120 and/or device 122 initialization.

Figure 3:
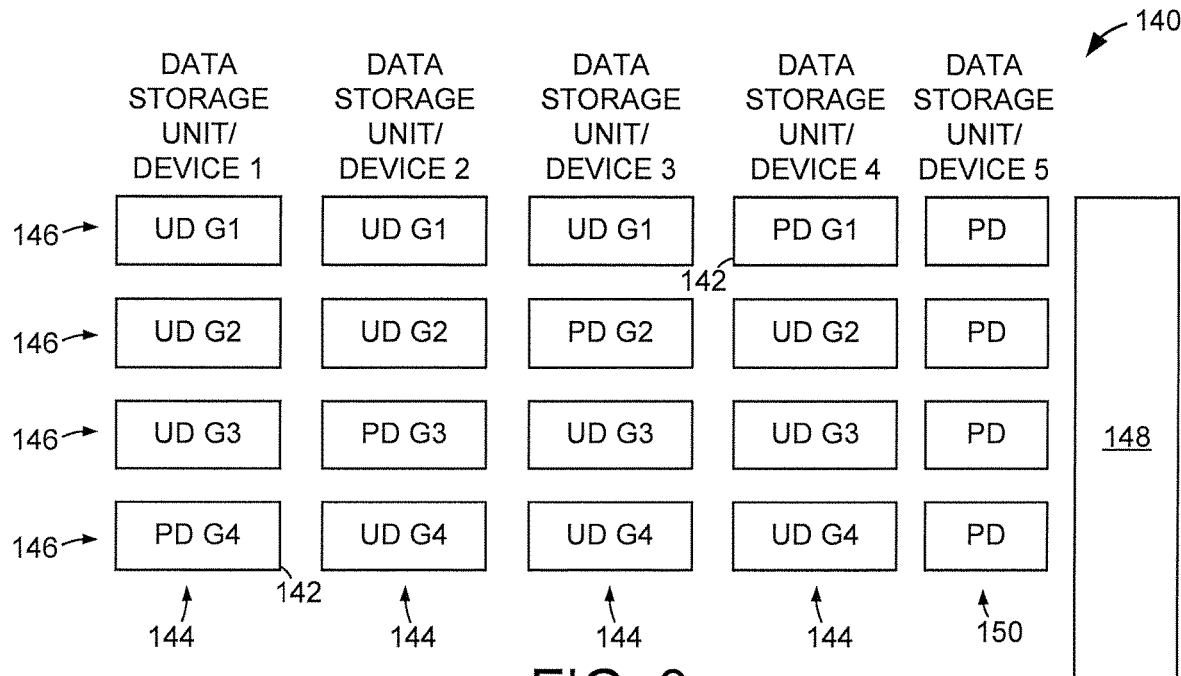
FIG. 3 depicts a block representation of portions of an example data storage system arranged in accordance with assorted embodiments.

FIG. 3 conveys a block representation of a portion of a distributed data storage system 140 operated as a RAID. The distributed data storage system 140 has a number of different physical block addresses 142 where data is stored as part of a RAID. It is noted that the various block addresses 142 can correspond with different data storage devices and/or different data storage units.

For instance, each column 144 can correspond with a single data storage unit/device while each row 146 can correspond with physical block locations on different data storage units/devices. Such distribution increases the reliability of retained data while allowing a controller 148, such as a network and/or unit controllers, to optimize data accesses based on the load and performance characteristics of the different units/devices.

As shown, data strings (G1, G2, G3, G4) of user-generated data (UD) are stored in the RAID data storage system 140 can be distributed across different block addresses 142, which can be characterized as striping one or more data blocks/strings. Such striped data occupies multiple columns 144 and can occupy multiple rows 146 in combination with other user-generated data blocks/strings. To verify the integrity of the user-generated data, parity data (PD) is computed and stored in designated block addresses 142. Depending on the RAID level, such as 0, 4, 5, or 6, the parity data can be resident in a single column 150 or rotated among different columns 144.

The controller 148 can direct the striping of user-generated data across multiple different columns 144 along with the generation and maintenance of the parity data. Such parity data maintenance can be complicated by updates to previously written data, the addition of new block addresses, and the presence of block addresses 142 that are unused. In some embodiments, the controller 148 computes and verifies/overwrites the parity data upon each unit/device initialization, which can be characterized as any new activation of the data storage units/blocks that make up the distributed data storage system 140. Such parity data computation upon initialization can be costly in terms of system processing and time when the data storage system has numerous other start-up/boot operations running and/or pending.

Therefore, the elimination of parity computations upon device/unit initialization can optimize performance of the distributed data storage system, particularly during start-up/boot of one or more data storage units/devices. In yet, the computation of parity data is necessary to verify the integrity of the user-generated data striped across multiple data storage devices/units. Accordingly, assorted embodiments compute parity data after writing the user-generated data instead of upon initialization of a data storage device/unit.

Figure 4A:
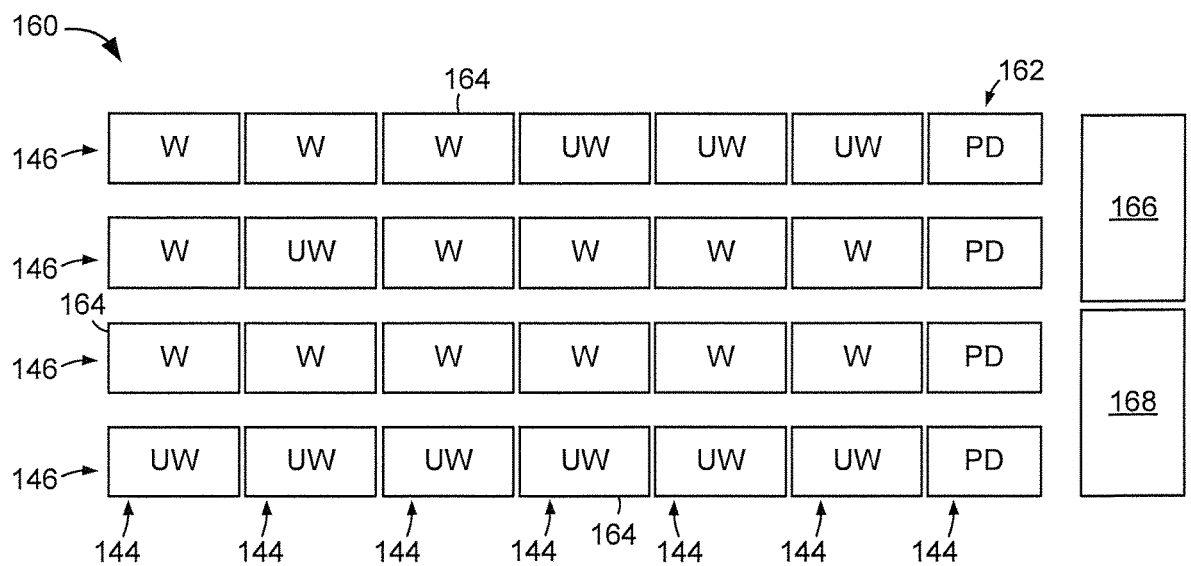
FIGS. 4A and 4B respectively show block representations of portions of an example data storage system configured in accordance with some embodiments.
Figure 4B:
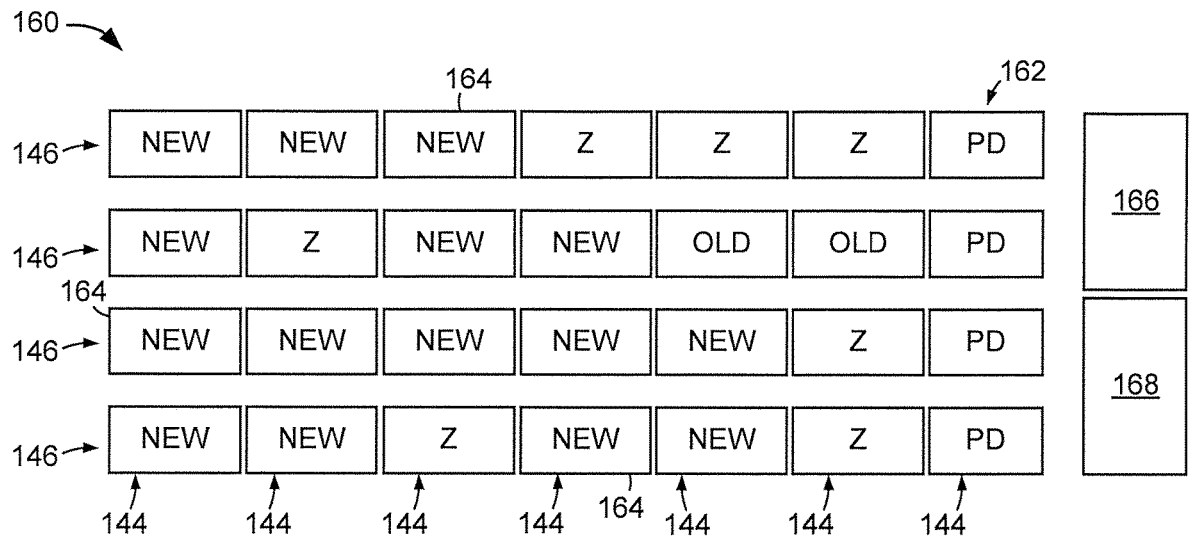

FIGS. 4A and 4B respectively display block representations of portions of an example data storage system 160 configured as a RAID and operated in accordance with some embodiments. In FIG. 4A, a portion of a RAID group 162 is shown that consists of a plurality of different physical block addresses 164 located in different data storage units and/or devices. It is contemplated, but not required, that the respective various columns 144 each corresponds with a single data storage device while the various rows 146 each corresponds with a different data storage unit/device.

User-generated data is stored in assorted block addresses 164, marked as W, as directed by the controller 166, which can be one or more local, or remote, controllers, such as the device controller 126, unit controller 124, and/or network controller 108. However, not all block addresses 164 contain user-generated (W) or parity data (PD), which is designated as unused or unwritten (UW) locations. The controller(s) 166 can log the locations of parity and user-generated data, which allows for identification of unused addresses 164. Such logging can be conducted in real-time currently with the storage of data or retroactively.

The logged locations of used and unused block addresses 164 can be characterized as a RAID map that is compiled and stored in memory 168 at a higher logical level than a single data storage device. That is, the RAID map can be stored in memory corresponding to a unit controller or a network controller instead of in each data storage device of a data storage unit. The centralized compilation of a RAID map allows the unit/network controller to efficiently translate metadata associated with data writes to the data storage system 160 into the locations of user-generated and parity data as well as unused locations. In some embodiments, the memory 168 also stores addresses 164 of the most recent versions of user-generated data, which triggers the controller 166 to alter the status of out-of-date versions of user-generated data to old (OLD) that are ready to receive new data.

Conventionally, the parity data (PD) is initialized for the respective user-generated data either online or offline by considering all addresses 164 as zero values or by reading all addresses 164. It can be appreciated that either approach is problematic in the amount of time and processing involved as well as in the inaccuracy of parity computations when all addresses 164 are zeroed. Hence, various embodiments eliminate parity initialization either online or offline by computing parity after data is written to the RAID group 162.

FIG. 4B illustrates how the RAID group 162 of FIG. 4A can change as new data is written to some, or all, of the block addresses 164. The storage of new user-generated data (NEW) to assorted RAID group locations is tracked by the controller 166 and mapped in the memory 168 so that new parity data can be computed in stored. The unused block addresses 164 are then assumed to be zero values (Z) for the computation of the new parity data.

It is contemplated that old user-generated data is given a zero value for parity computations, but such arrangement is not required as out-of-data user-generated data may be factored into the new parity computations. The ability to assume zero values for unused and/or old block addresses allows the controller 166 to selectively execute a variety of different parity computations in response to current system load, such as pending data access requests and/or available processing volume, to optimize the speed and accuracy of parity computations, particularly in partial stripe write conditions where less than all a row 146 is written with user-generated data.

By consulting the RAID map stored in the memory 168, the controller 166 can efficiently compute parity data for the user-generated data located on at least one column 144 and row 146. The assumption of a zero value for at least unused block addresses 164 allows the controller 166 to quickly and accurately generate, and/or verify, parity data without the time and processing intensive reading of each block address 164 of the RAID group 162 or setting all bock addresses 164 to zero values.

In some embodiments, the controller 166 computes parity data on a row-by-row or column-by-column basis where less than all the unused block addresses 164 of the RAID group 162 are assumed to be zero values. Such column 144 or column 146 selective parity computations provides the controller 166 additional mechanism for decreasing the time and processing involved with parity computations. For instance, the controller 166 can compute parity data for a data string occupying less than all of a row 146 by assuming the unused block addresses of only that row 146 are zero values and without designating unused block addresses 164 of other rows 146 as zero values.

Figure 5:
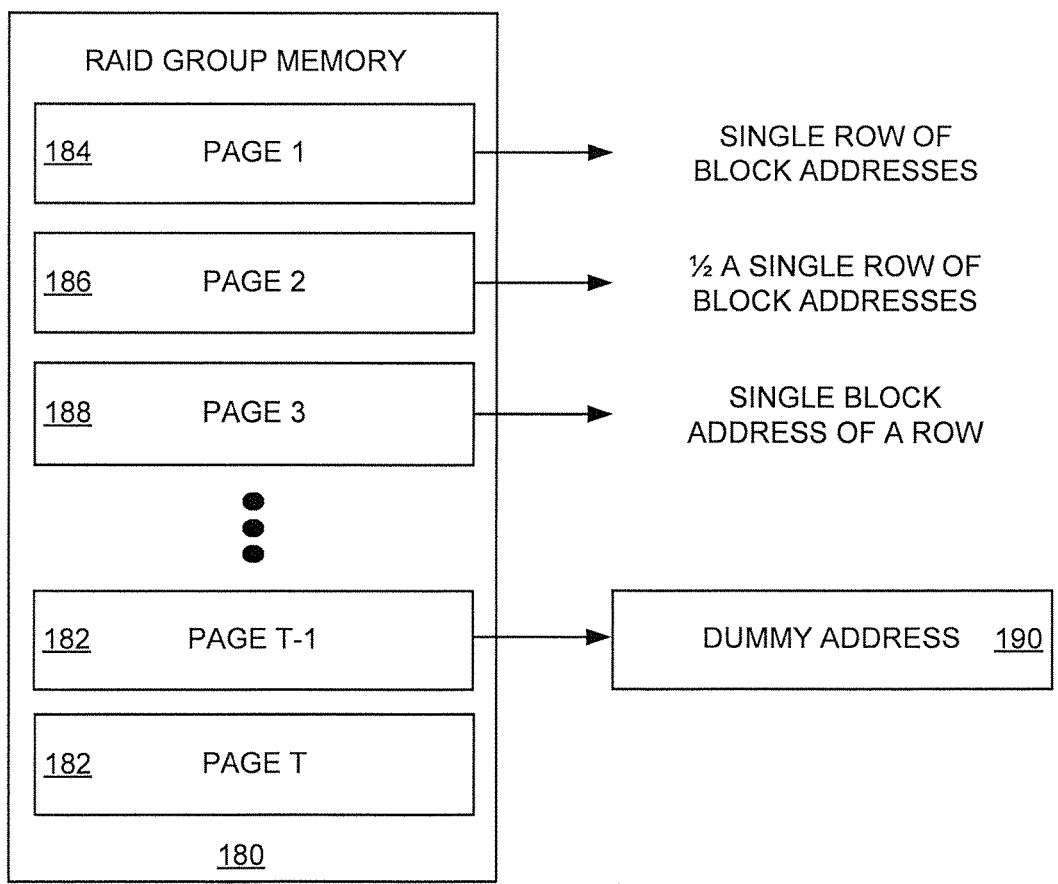
FIG. 5 conveys a block representation of an example memory that may be utilized in the data storage systems of FIGS. 1, 4A, and 4B.

FIG. 5 illustrates a block representation of portions of an example RAID group memory 180 that services at least one RAID group comprising multiple separate data storage units/devices in accordance with various embodiments. The memory 180 has a plurality of pages 182 (1 to T) that correspond to block addresses 164 of the associated RAID group. The granularity of the respective pages 182 can match or be different to provide efficient mapping of unused portions of the RAID group.

The granularity of the respective pages 182 are not set to a particular number of block addresses and can, in some embodiments, be configured to provide a hierarchy of granularity that allows for optimized controller 166 identification of unused block addresses 164. As a non-limiting example, a first page 184 has a granularity of a single row 146 of block addresses in the RAID group while a second page 186 has a granularity of less than all of a row 146, such as half the block addresses 164, and a third page 188 has a granularity of a single block address 164 of a row 146. Such hierarchical page 182 structure allows the controller 166 to quickly and accurately identify what block addresses 164 of a row 146 are occupied with user-generated data. Similarly, the page hierarchy can identify the block addresses 164 that are out-of-date user-generated data.

The page configuration of the memory 180 can additionally provide efficient data storage system adaptation to changes in a RAID group. In the event a data storage device or unit is taken offline, the controller 166 can map the pages 182 of the removed device/unit to dummy locations 190 while the pages are set with zero values by the controller 166 at a convenient time. That is, the controller 166 can effectively remove the pages 182 corresponding to removed block addresses by setting the pages 182 to zero values and re-assigning the pages 182 to fictitious block addresses (dummy) so that the controller 166 does not utilize the contents of the pages 182 for parity computations prior to them being set to zero values.

The controller 166 may also map to dummy locations 190 if less than all of a RAID group is temporarily offline, such as in response to a device error or failure, prior to being brought back online. In other words, the controller 166 can temporarily set one or more pages 182 to dummy locations 190, but not zero out the respective pages 182 if it is inevitable, likely, predicted, or convenient that the block addresses will return. Hence, the controller 166 can intelligently determine if a block addresses are temporarily or permanently offline and wait to set the addresses to zero values while protecting the efficiency of parity computations by assigning the offline addresses to dummy locations 190.

As a result of the intelligence of the controller 166, pages assigned to offline block addresses can have zero values or be brought back online with the original block address assignments and data identifying the addresses as written, or unwritten, with user-generated data. It is contemplated that the controller 166 reallocates the block address assignment of pages 182 to different portions of the RAID group or holds the pages 182 in anticipation of newly added block addresses. Such reallocation or holding of pages 182 can avoid zeroing out the pages 182 and instead merely changes the block address assignment of those pages 182. However, it is possible that the reallocated or held pages 182 are set to zero values if designated appropriate by the controller 166.

Figure 6:
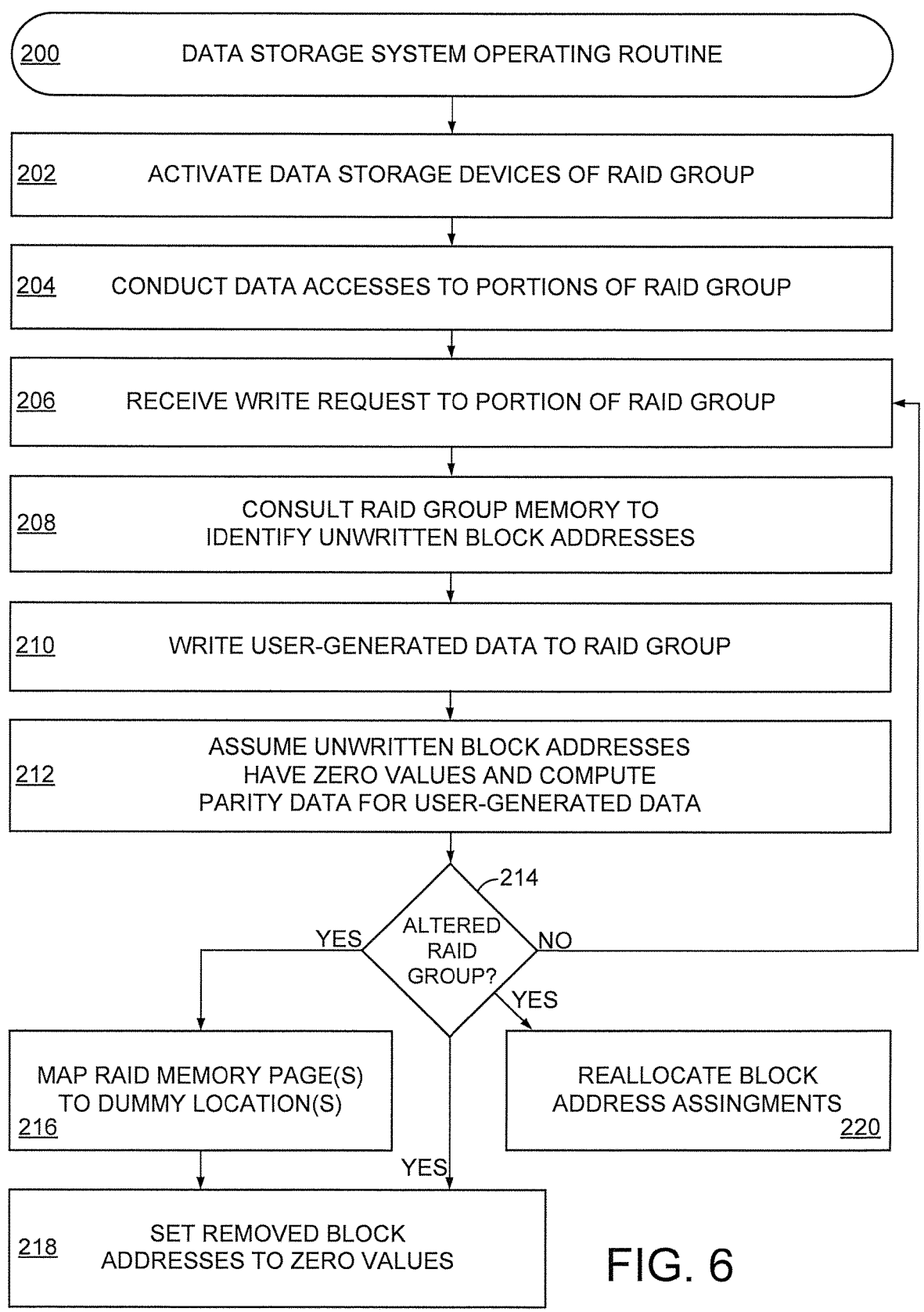
FIG. 6 is a flowchart of an example data storage system operating routine that can be carried out by the embodiments of FIGS. 1-5.

FIG. 6 is a flowchart of an example data storage system operating routine 200 that can be carried out by a data storage system comprising any number of aspects from FIGS. 1-5. Initially, step 202 conducts start-up (boot) operations to bring a plurality of data storage devices/units online without conducting parity initialization, such as reading each block address of a RAID group or assigning zero values to some, or all, of the block addresses.

However, it is contemplated that the RAID group may have previously computed parity data stored therein. Thus, step 202 is executed to activate the assorted data storage devices/units of a RAID group as a distributed data storage system without conducting any online or offline parity computations for user-generated data stored in the RAID group. As a result of step 202, the various data storage devices of a RAID group will be available for data accesses in step 204 without the presence of current parity data stored in the RAID group. Such data accesses can be any number of host-initiated read requests for data pre-existing in the RAID group prior to step 202 that are executed by a controller to return the requested data to the host.

Receipt of a write request to at least one block address of the RAID group in step 206 triggers step 208 to consult the RAID group memory to determine the location of unused block addresses in the RAID group. It is contemplated that at any time the RAID group controller can compile a map of the status of the various block addresses in the RAID group, such as written, unwritten, and old. The RAID group mapping may involve consulting metadata of the user-generated data of the RAID group and/or reading each block address of the RAID group.

The identification of unused block addresses allows step 210 to write the requested user-generated data to the RAID group while knowing if an entire RAID group row is being written. If the data string associated with the write request fills an entire RAID group row, no assumptions of zero block address values are needed. However, if the write request fills less than all a RAID group row in step 210, step 212 assumes unwritten block addresses of the row have zero values for the computation of parity data for the user-generated data written in step 210. It is contemplated that routine 200 can cycle through steps 202-212 any number of times to conduct read and/or write operations to a RAID group.

Decision 214 continuously, sporadically, or routinely monitors RAID group status and activity to determine if alterations have been made voluntarily and/or unexpectedly. For instance, decision 214 can monitor for data storage device/unit errors and failures, the addition of block addresses, and the removal of block addresses. If no RAID group alteration is detected or predicted, routine 200 returns to servicing data access requests via steps 204-212. If an alteration is detected or predicted, the RAID group controller can intelligently determine an optimal adaptation strategy that can map the page(s) of the RAID group memory corresponding to the removed block addresses to a dummy location in step 216. The RAID controller may set removed block addresses to zero values in step 218 from decision 214 or after executing step 216.

An altered RAID group determination in decision 214 can alternatively result in steep 220 reallocating the block address assignments of at least one page of the RAID group memory without mapping to a dummy location or assigning zero values. The ability to intelligently select steps 216, 218, and 220 in response to an altered RAID group allows the RAID group controller to optimize the mapping of block addresses by the pages of the RAID group memory, which corresponds with efficient and accurate mapping of the RAID group and identification of unused and old block addresses in step 208.

It is noted that the various aspects of routine 200 are not required or limiting. As such, any aspect can be changed or removed just as any step or decision can be added. For instance, an additional step can compile and/or verify the mapping of the block addresses of the RAID group prior to step 208 consulting the RAID group map in the RAID group memory to identify unused block addresses.

Through the various embodiments of the present disclosure, online and offline parity initialization is eliminated for a RAID group comprising multiple separate data storage devices/units. Instead, parity data is computed after user-generated data is stored to the RAID group with unused block addresses being assigned zero values. By compiling a map of the block addresses of a RAID group in pages of a RAID group memory, the RAID group controller can optimize the identification of unused and out-of-date data in the RAID group, which allows for efficient assumption of zero values for parity computations. The delay of parity computations until after data is written to a RAID group further allows for intelligent scheduling, such as during low system processing events or during writes to block addresses of the RAID group proximal to the location of parity data designated by the provisioned RAID level.

What is claimed is:

1. An apparatus comprising a storage controller connected to a storage memory and multiple data storage units, each data storage unit comprising at least one data storage device providing data locations for distributed data storage as directed by the storage controller, the storage controller configured to compute parity data for a plurality of data locations with each data location of the respective data storage units containing an out-of-date version of user data assumed as a zero value and each written data location of the respective data storage units containing a current version of user data having a non-zero value.

2. The apparatus of claim 1, wherein the storage controller assumes unwritten data locations of the respective data storage units as a zero value.

3. The apparatus of claim 1, wherein each data storage unit has a unit controller that is separate from the storage controller.

4. The apparatus of claim 1, wherein each data storage device of the at least one data storage device has a device controller that is separate from the respective storage and unit controllers.

5. The apparatus of claim 1, wherein the parity data is located on a single data storage unit.

6. The apparatus of claim 1, wherein the parity data is located on multiple different data storage devices of the at least one data storage device.

7. The apparatus of claim 1, wherein each data storage unit comprises a unit memory and each data storage device has a device memory, the unit memory and device memory being separate and different.

8. A method comprising:
connecting a storage controller to a storage memory and multiple data storage units;
arranging data locations of data storage devices of the respective data storage units as logical rows and columns as directed by the storage controller;
receiving a write request to data locations of a distributed data storage group;
writing user-generated data of the write request to the data locations of the distributed data storage group;
identifying data locations of the distributed data storage group containing out-of-date versions of user-generated data; and
computing parity data for the distributed data storage group with each written data location of the distributed data storage group containing a current version of user data having a non-zero value while assuming each data location of the distributed group containing the out-of-date versions of user-generated data has a zero value.

9. The method of claim 8, wherein the storage controller compiles a map of each data location of the data storage units in the storage memory.

10. The method of claim 9, wherein the map is compiled from metadata associated with the respective data locations of the data storage units.

11. The method of claim 8, wherein the distributed data storage group is a logical row.

12. The method of claim 11, wherein the distributed data storage group spans multiple different logical columns.

13. The method of claim 8, wherein the zero values of the respective data locations containing the out-of-date versions of user data are factored into the parity data by the storage controller.

14. The method of claim 8, wherein the storage controller identifies the out-of-date versions of user-generated data in the distributed data storage group by consulting the storage memory.

15. The method of claim 8, wherein the storage memory is arranged as a plurality of pages having a granularity of less than a logical row of data locations.

16. The method of claim 15, wherein the storage controller reassigns at least one page of the plurality of pages to different data locations in response to an alteration of at least one data storage unit.

17. The method of claim 15, wherein the storage controller assigns at least one page of the plurality of pages to fictitious data locations in response to an alteration of at least one data storage unit.

18. A method comprising:
connecting a storage controller to a storage memory and multiple data storage units;
arranging data locations of data storage devices of the respective data storage units as logical rows and columns as directed by the storage controller;
receiving a write request to a distributed data storage group;
writing user data of the write request to the data locations of the distributed data storage group;
consulting the storage memory to identify unwritten data locations of the distributed data storage group and data locations containing an out-of-date version of user data;
computing parity data for the distributed data storage group while assuming each unwritten data location has a zero value and each data location containing the out-of-date version of user data has a zero value, at least one data storage location of the distributed data storage group identified as written with a current version of user data and less than all of the data storage locations of the distributed data storage group has a zero value; and
writing the parity data to the distributed data storage group.

19. The method of claim 18, wherein user data present in a data storage unit is sent to a host without computing the parity data for the user-generated data since a previous data storage unit activation session.

20. The method of claim 19, wherein the user data is verified with parity data computed during the previous data storage unit activation session.

* * * * *